United States Patent
Sonalker et al.

(10) Patent No.: US 10,846,166 B2
(45) Date of Patent: *Nov. 24, 2020

(54) TEMPORAL ANOMALY DETECTION ON AUTOMOTIVE NETWORKS

(71) Applicant: Battelle Memorial Institute, Columbus, OH (US)

(72) Inventors: Anuja Sonalker, Ellicott City, MD (US); David Sherman, Union Hall, VA (US)

(73) Assignee: Batttelle Memorial Institute, Columbus, OH (US)

( * ) Notice: Subject to any disclaimer, the term of this patent is extended or adjusted under 35 U.S.C. 154(b) by 163 days.

This patent is subject to a terminal disclaimer.

(21) Appl. No.: 16/109,039

(22) Filed: Aug. 22, 2018

(65) Prior Publication Data

US 2018/0365094 A1 Dec. 20, 2018

Related U.S. Application Data

(63) Continuation of application No. 14/857,098, filed on Sep. 17, 2015, now Pat. No. 10,083,071.

(60) Provisional application No. 62/097,891, filed on Dec. 30, 2014.

(51) Int. Cl.
*G06F 11/07* (2006.01)
*H04L 29/06* (2006.01)

(52) U.S. Cl.
CPC ........ *G06F 11/079* (2013.01); *G06F 11/0739* (2013.01); *G06F 11/0772* (2013.01); *H04L 63/1425* (2013.01)

(58) Field of Classification Search
CPC combination set(s) only.
See application file for complete search history.

(56) References Cited

U.S. PATENT DOCUMENTS

| 8,527,714 | B2 * | 9/2013 | Labarre | H04L 12/56 711/152 |
|---|---|---|---|---|
| 8,661,419 | B2 * | 2/2014 | Munzenberger | G06F 9/455 717/135 |
| 8,955,130 | B1 * | 2/2015 | Kalintsev | G06F 21/567 726/23 |

(Continued)

*Primary Examiner* — Amine Riad
(74) *Attorney, Agent, or Firm* — Fay Sharpe LLP

(57) ABSTRACT

An anomaly detector for a Controller Area Network (CAN) bus performs state space classification on a per-message basis of messages on the CAN bus to label messages as normal or anomalous, and performs temporal pattern analysis as a function of time to label unexpected temporal patterns as anomalous. The anomaly detector issues an alert if an alert criterion is met that is based on the outputs of the state space classification and the temporal pattern analysis. The temporal pattern analysis may compare statistics of messages having analyzed arbitration IDs with statistics for messages having those analyzed arbitration IDs in a training dataset of CAN bus messages, and a temporal pattern is anomalous if there is a statistically significant deviation from the training dataset. The anomaly detector may be implemented on a vehicle Electronic Control Unit (ECU) communicating via a vehicle CAN bus. The anomaly detector does not rely on an database of messages and their periodicity from manufacturers (dbc files) and in that sense is truly a zero knowledge detector.

15 Claims, 3 Drawing Sheets

(56) References Cited

U.S. PATENT DOCUMENTS

| | | | | |
|---|---|---|---|---|
| 9,401,923 | B2* | 7/2016 | Valasek | H04L 63/1408 |
| 2009/0288175 | A1* | 11/2009 | Sun | G06F 21/34 |
| | | | | 726/35 |
| 2011/0160951 | A1* | 6/2011 | Ishigooka | G07C 3/02 |
| | | | | 701/31.4 |
| 2014/0337976 | A1* | 11/2014 | Moeller | H04W 12/12 |
| | | | | 726/23 |
| 2016/0173513 | A1* | 6/2016 | Rohde | H04L 12/4625 |
| | | | | 726/23 |
| 2016/0188876 | A1* | 6/2016 | Harris | G06F 21/554 |
| | | | | 726/23 |
| 2016/0197944 | A1* | 7/2016 | Allouche | H04L 63/1466 |
| | | | | 726/23 |

\* cited by examiner

TEMPORAL ANOMALY DETECTION ON AUTOMOTIVE NETWORKS

This application is a continuation of U.S. patent application Ser. No. 14/857,098, filed Sep. 17, 2015 and titled "TEMPORAL ANOMALY DETECTION ON AUTOMOTIVE NETWORKS", which claims the benefit of U.S. Provisional Application No. 62/097,891 filed Dec. 30, 2014 and titled "TEMPORAL ANOMALY DETECTION ON AUTOMOTIVE NETWORKS". U.S. Provisional Application No. 62/097,891 filed Dec. 30, 2014 is incorporated herein by reference in its entirety.

BACKGROUND

The following relates to the machine classification arts, embedded system arts, automotive network analysis arts, and related arts.

Vehicles (automobiles, trucks, watercraft, aircraft, et cetera) are increasingly utilizing embedded electronic systems. In the automotive context, embedded system units are usually referred to as Electronic Control Units (ECUs), and are commonly networked on a Controller Area Network bus (CAN bus). In a typical communication protocol, a message includes a header, typically including a message identifier (arbitration ID) followed by a network identifier (network ID) then followed by a set of data bytes (e.g. 8 bytes=64 bits). In some standard automotive CAN bus architectures, the header is 11 bits (2048 possible IDs) or 29 bits (~500 million possible IDs). Collisions are arbitrated by prioritizing the ID with the most leading zeros; the lower priority message is then re-sent after a specified delay.

There is an expectation in the automotive industry (supported by governmental regulations in some instances) that the CAN bus architecture should be "open" in the sense that third-party manufacturers should be able to provide ECU-equipped components that can connect with an existing CAN bus. This creates a potential entry point for exploitation and challenges in providing CAN bus security against inadvertent glitches and intentional intrusion (e.g. hacking of an ECU or of the entire CAN bus network). Likewise, there are several new entry points for exploitation and pose challenges. A few examples of vulnerable entry points are the tire pressure monitoring system (TPMS), RADAR, LIDAR, camera, on-board diagnostics (e.g. OBD-II), USB, Bluetooth, Wifi enabled on-vehicle hotspots, and cellular connections. The consequences of an unintentional glitch or intentional hack can range from very minor (e.g. the car stereo volume decreasing) to very serious (e.g. loss of vehicle braking, uncontrolled engine acceleration, or aircraft flight control interference).

BRIEF SUMMARY

In one disclosed aspect, an anomaly detector for a Controller Area Network (CAN) bus comprises an electronic data processing device programmed to perform an anomaly alerting method including the operations of: performing state space classification on a per message basis of messages on the CAN bus to label each message as either normal or anomalous; performing temporal pattern analysis of messages on the CAN bus as a function of time to label unexpected temporal patterns as anomalous; and issuing an alert if an alert criterion is met that is based on the outputs of the state space classification and the temporal pattern analysis.

In another disclosed embodiment, an anomaly detector for a CAN bus comprises an electronic data processing device programmed to perform an anomaly alerting method including the operations of: performing temporal pattern analysis of messages on the CAN bus as a function of time to label unexpected temporal patterns as anomalous; and issuing an alert if an output of the temporal pattern analysis meets an alert criterion.

In other disclosed aspects, a vehicle includes a vehicle CAN bus and a vehicle Electronic Control Unit (ECU) communicating via the vehicle CAN bus, in which the vehicle ECU is programmed to implement an anomaly detector as set forth in either one of the two immediately preceding paragraphs. Analogous method and non-transitory storage medium embodiments are also disclosed.

In the preceding embodiments, the temporal pattern analysis may include the operations of: comparing statistics of messages having analyzed arbitration IDs with statistics for messages having the analyzed arbitration IDs in a training dataset of CAN bus messages; and labeling a temporal pattern of messages on the CAN bus as anomalous if the statistics comparison indicates a statistically significant deviation from the training dataset of CAN bus messages.

DETAILED DESCRIPTION

Figure 1:
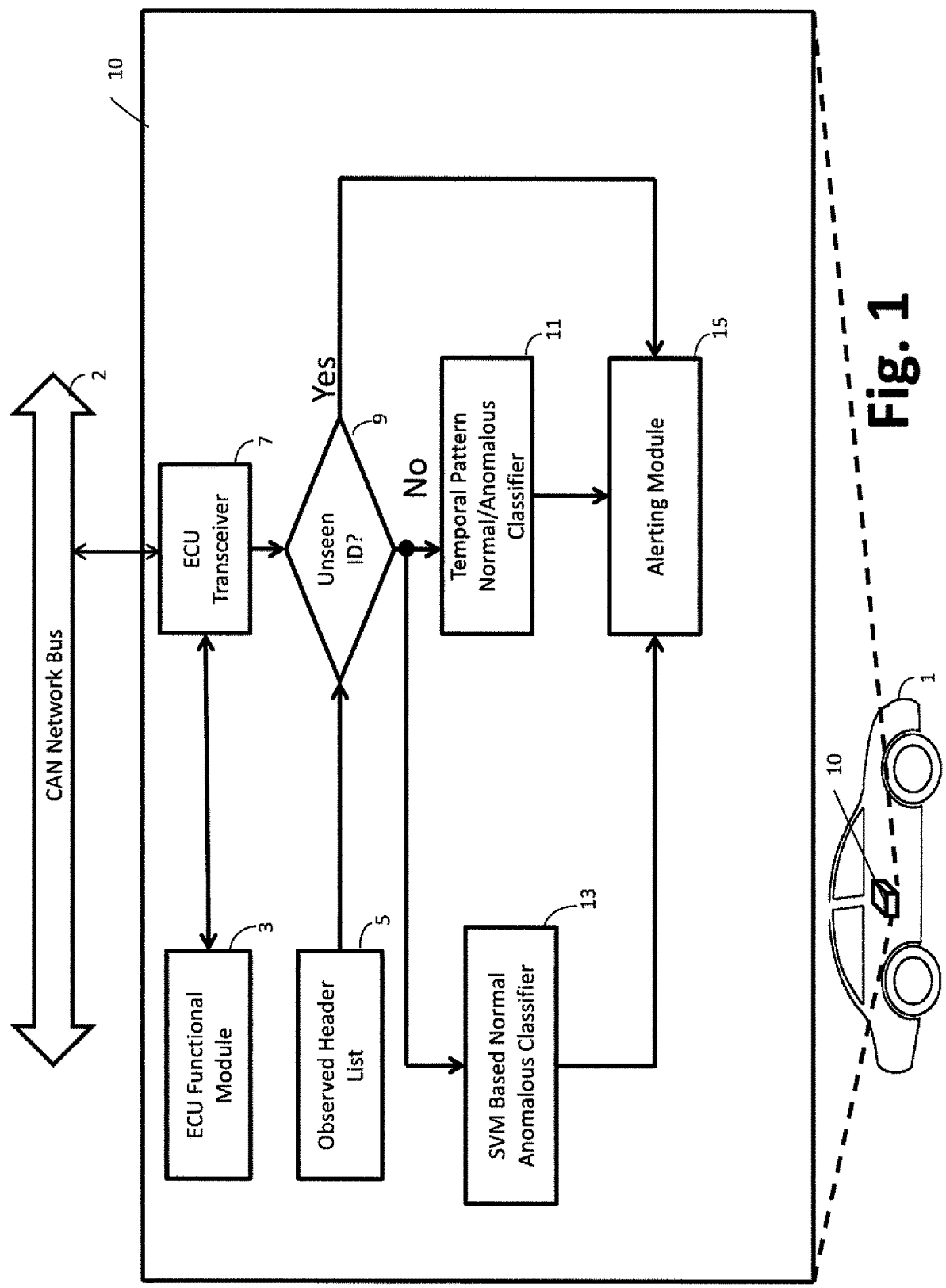
FIG. 1 diagrammatically shows a vehicle with an automotive Controller Area Network (CAN) bus monitored by an anomaly detection system as disclosed herein.

An approach to CAN bus security in the face of "zero knowledge" context is zero-knowledge anomaly detection. In a rough conceptual sense, an anomaly is either a glitch or an intrusion (e.g. hacking)—more generally, CAN bus traffic that should not be present. In the CAN bus context, a priori knowledge of what types of messages may be transmitted by a given ECU may be limited (e.g., due to traffic introduced by aftermarket components connected with the CAN bus).

As used herein, an anomaly is defined as follows: an anomaly is a statistically significant deviation from normal CAN bus behavior as gleamed from CAN bus message traffic. "Statistically significant" means that the deviation from normal CAN bus behavior is sufficient, measureable and greater than the allowable limit. An anomaly detection system can be constructed based on statistical analysis of a training data set consisting of CAN bus traffic acquired from a vehicle known to be operating normally. For example, training data can be acquired at the automobile manufacturer facility, using a vehicle straight off the assembly line, or a pre-production model, or some other vehicle. This approach is unusual in that the training data are all "negative" samples, that is, all of the training data are "normal" and none of the training data are anomalies. Thus, ideally, after training on such data the anomaly detection system should not generate any anomaly alerts.

In some illustrative anomaly detection systems described herein, the anomaly detection algorithm comprises a Support Vector Machine (SVM) trained to operate as a one-class classifier outputting either a positive value (indicating an anomaly) or a negative value (indicating a normal message). (These designations can be reversed in a specific embodiment. The one-class classifier can also be thought of as a binary classifier in which one "class" is "anomaly" and the other "class" is "normal message" or "not anomaly"). Each message is treated as a vector residing in a high-dimensional vector space. For example, in one CAN bus architecture a message includes (in time-order): a message ID; a network ID; and eight data bytes. This can be represented by a vector having ten dimensions: one for the message ID; one for the network ID; and eight additional dimensions for the eight respective data bytes. In the illustrative SVM paradigm, the training set consists of a set of training vectors, and a sub-set of the training vectors forms the set of Support Vectors. A hyperplane is defined respective to the Support Vectors that is optimized by the SVM training to separate positive samples from negative samples while maximizing margins to the nearest training samples in the vector space. The illustrative one-class SVM classifier employs a Radial Basis Function (RBF) as the kernel for defining the hyperplane. Representing a Support Vector by x and a (message) vector to be classified by y, the RBF $f(x,y)$ is defined as:

$$f(x,y)=e^{-\gamma((x_1-y_1)^2+(x_2-y_2)^2+\ldots+(x_n-y_n)^2)} \quad (1)$$

where n is the number of dimensions of the vectors (e.g. n=10 in the illustrative CAN bus message with a message and a network ID element and eight data bytes) and $\gamma$ characterizes the curvature of the RBF kernel $f(x,y)$, During SVM training, the Support Vectors are chosen from the training sub-set by the SVM training algorithm so as to provide positive/negative sample segregation with maximized margins, typically subject to additional constraints defined by tuning parameters.

In a typical SVM approach, the tuning parameters include the already-mentioned $\gamma$ parameter, which controls the shape or curvature of the separating hyperplane. A larger value of $\gamma$ increases hyperplane curvature and also tends to increase the number of Support Vectors chosen during the SVM training. Another tuning parameter, $\nu$, defines a lower bound on the number of Support Vectors, and also presents an upper bound on the number of training samples that may be erroneously classified (this error count can be reduced by forced adding of Support Vectors). A tuning parameter E defines a penalty for data points inside the margin (i.e. too close to the hyperplane), and may be viewed as controlling granularity of the hyperplane.

Conventionally, SVM training is performed as follows. The tuning parameters $\gamma$, $\nu$, $\varepsilon$ (or additional or other tuning parameters depending upon the particular SVM model being employed) are chosen, and SVM training is performed to optimize selection of the Support Vectors so as to optimally segregate positive from negative samples while satisfying constraints defined by the tuning parameters $\gamma$, $\nu$, $\varepsilon$. In the conventional approach, the user may then choose to adjust the tuning parameters $\gamma$, $\nu$, $\varepsilon$ and repeat the training, so as to tune the SVM classifier by trial-and-error. After the training phase is complete, the trained SVM classifier is applied to classify a new message represented by the message vector y according to:

$$\sum_{i=1}^{N} f(x_i, y) > \rho \quad (2)$$

where $f$ is given in Expression (1), the tuning parameters $\gamma$, $\nu$, $\varepsilon$ from the training are used, N is the number of support vectors chosen by the SVM training, and the vectors $x_1, \ldots, x_N$ are the Support Vectors chosen by the training. The message y is classified as anomalous if the sum in Expression (2) is greater than the threshold $\rho$ because it is too far away from the trained hyperplane; otherwise, the message is classified as normal. Since the parameter $\varepsilon$ relates to the margin around the trained hyperplane, in some embodiments the threshold $\rho=N\varepsilon$ is used in Expression (2).

The above-described SVM-based classifier is merely an illustrative example, and other machine learning approaches can be employed to generate an anomalous message classifier that operates on a per message basis, classifying each message as either normal or anomalous. While the illustrative SVM-based classifier operates on a "zero-knowledge" basis, it is also contemplated for the anomalous message classifier to leverage information about anomalies obtained from sources such as actually observed control system hacks or inadvertent glitches or the like.

However, it is recognized herein that glitches or intentional intrusions may not introduce abnormal (i.e. anomalous) messages. For example, an intentional hack may consist of a sequence of messages each of which is, in and of itself, a normal message that would not be flagged as anomalous by the SVM classifier (or by any other anomalous message classifier operating on a per message basis). Rather, it is the sequence of messages itself, occurring at an unexpected time, or the rate at which they arrive, that is anomalous.

Accordingly, vehicle CAN bus security systems disclosed herein further include a temporal anomaly detection component, that detects anomalous temporal sequences of CAN bus messages via a temporal detection algorithm.

In a typical CAN bus architecture, collision avoidance is achieved on the CAN bus by transceivers constantly listening on the bus, transmitting on empty channel, and resolving collisions by backing off based on the priority of the message ID being sent. For this reason, message IDs are also called Arbitration IDs. They serve a dual purpose of interpreting the content of the payload carried, as well as resolving collisions. This enables the CAN bus to avoid throughput losses due to collisions, and back-offs resulting therefrom. However, CAN networks are not designed with delivery reliability of individual messages in mind. Rather, high reliability is achieved by repeated transmission of the same message(s) over periods of relevance. In typical automotive CAN bus operation, various types of message periodicities tend to occur. Some messages are transmitted periodically throughout vehicle operation, while others are transmitted on-demand. Some messages are transmitted as a hybrids, periodically and on-demand. Still further, some messages are transmitted only as responses to specific events, or during special sessions such as diagnostics. It is recognized herein that this transmission scheme creates an opportunity for a type of Denial of Service (DoS) attack that cannot be detected by a "per-message" analysis. If messages are captured and replayed at a rate greater than the system can manage, this can overwhelm the system, causing a loss of system usability (due to the DoS). Even if denial of service does not result, the repeated replaying of "normal" messages that trigger control system responses has the potentially to cause (potentially catastrophic) damage to vehicles and passengers. For example, replaying a message sequence that activates acceleration, or braking, can produce an immediately dangerous situation. Yet such a message sequence would contain only normal messages that would not be flagged as anomalous by an anomaly detector operating on a per-message basis. By contrast, the temporal detection algorithms disclosed herein are able to detect the above classes of attacks as well as other types of attack that leverage timing and frequency characteristics of messages. The temporal detection algorithms disclosed herein can also detect certain types of unintentional ECU glitches, such as a software bug that creates an endless program loop resulting in repeated transmission of a message sequence. The temporal detection algorithm can be used alone or, as further disclosed herein, the temporal detection algorithm can be used in combination with a state space detector that analyzes CAN bus traffic on a per-message basis. The combination of temporal anomaly detection and state space anomaly detection synergistically enables detection of a wider range of attack classes.

Figure 2:
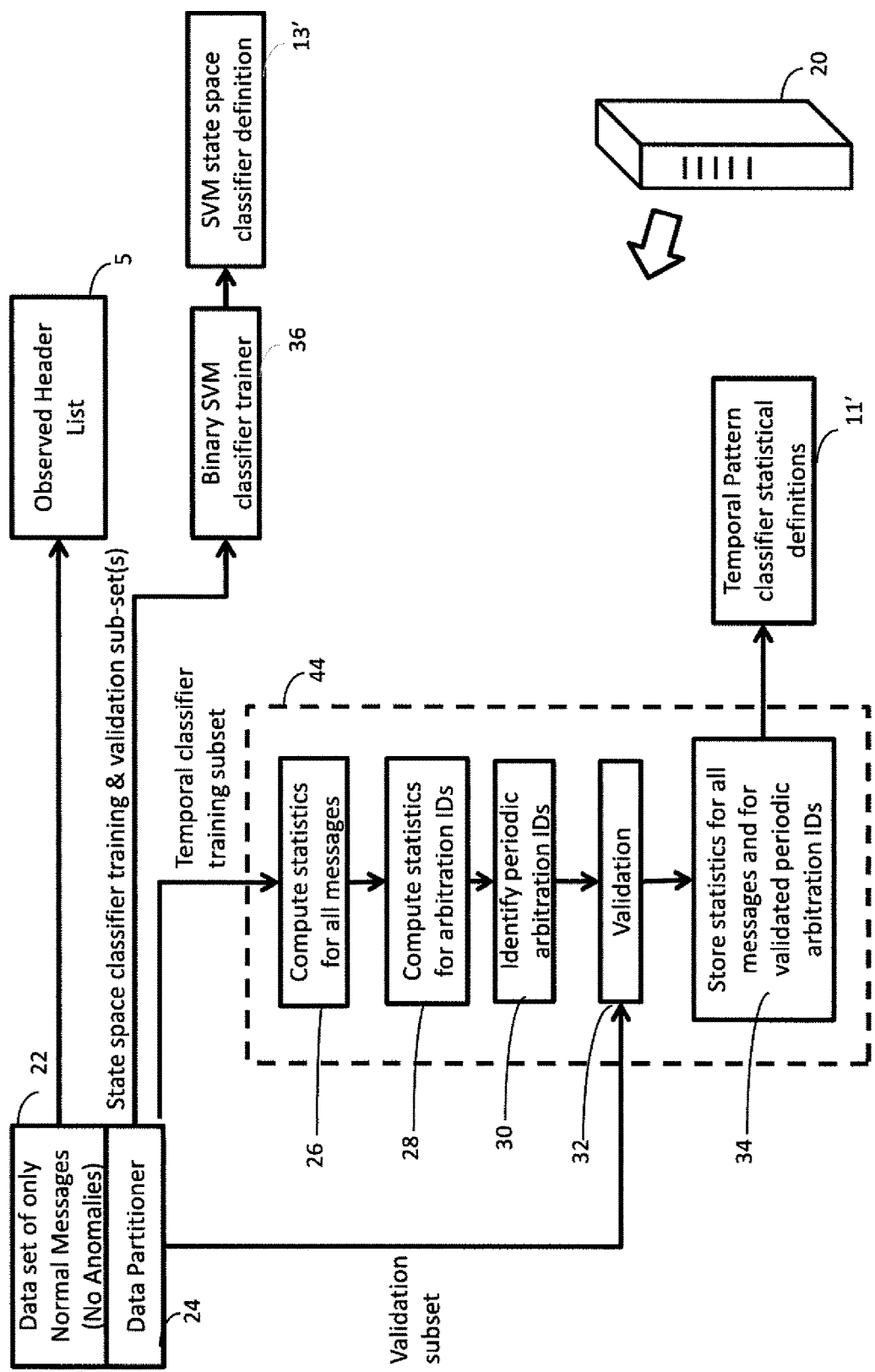
FIG. 2 diagrammatically illustrates a suitable system for training the anomaly detection system of the vehicle of FIG. 1.

With reference to FIGS. 1 and 2, an illustrative embodiment is shown, including the embedded system comprising an ECU (FIG. 1) and the training system for the temporal anomaly detection component (FIG. 2).

With particular reference to FIG. 1, a vehicle 1 includes a Controller Area Network (CAN) including a CAN bus 2 interconnecting Electronic Control Units (ECUs) including an illustrative ECU 10. The ECU 10 comprises a microprocessor or microcontroller and ancillary electronics (e.g. memory, an illustrative transceiver 7, or so forth) programmed to provide the desired functionality. This functionality is represented in the inset diagram representing the ECU 10 as an ECU functional module 3. For example, the ECU functional module 3 may provide engine control, brake control, entertainment system operation, or so forth. The ECU 10 is connected with a CAN bus 2 of the vehicle 1.

The ECU 10 includes an observed message header list 5, which is used by an unseen ID detector 9 to check if an arbitration ID (or other message header) is unseen (e.g., the arbitration ID is not on the observed header list 5). If a header is unseen, an indication will be sent to alerting module 15. If the arbitration ID is not unseen (e.g., it is on the observed header list 5), the message will be sent to both the temporal pattern normal/anomalous classifier 11 and the SVM based normal/anomalous classifier 13 for further analysis. If either the temporal ID pattern normal/anomalous classifier 11 or the state space anomaly detector 13, or both, determines that a message (or message pattern in the case of the temporal anomaly classifier 11) is anomalous, this will be indicated to the alerting module 15. The illustrative anomaly detection system thus provides a synergistic combination of three distinct anomaly detection mechanisms: (1) detection via unseen ID detector 9 of an message ID (header) that was never seen in the training data; (2) detection on a per-message basis of any message that does not fall within the range of "normal" messages as defined by the training of the state space classifier 13; and (3) detection of an anomalous sequence of (possibly individually normal) messages via the temporal ID pattern classifier 11. It will be appreciated that in various contemplated embodiments, any one, any two, or all three of the anomaly detectors 9, 11, 13 may be included in the security monitoring system.

The outputs of the various illustrative anomaly detectors 9, 11, 13 are input to the illustrative anomaly alert module 15. The anomaly alert module 15 issues an anomalous event alert if the detected anomalous messages meet some alert criterion, such as observing a density of anomalous messages (i.e. a count of anomalous messages in a defined time window) that exceeds a threshold. The issued anomalous event alert may be used in various ways. For example, if the anomalous events are traced to a particular ECU, then a warning that the ECU is compromised (either intentionally or due to some flawed firmware upgrade or the like that is causing the ECU to generate glitches). Such a warning may appear on the on-board computer display of the vehicle 1, or may be wirelessly transmitted to a centralized location (e.g. a monitoring center of the automobile manufacturer, who uses the information to monitor firmware upgrades) or so forth.

With particular reference to FIG. 2, a suitable system for generating the temporal classifier training may be performed by a high capacity computer system 20 that is separate from the ECU 10. For example, the computing system 20 may be a network-based server computer, a parallel computing system with multiple CPUs, a cluster computing system, a cloud-based computering resource, or so forth. The illustrative training is performed using a dataset of only normal messages 22 represented as vectors (e.g. two dimensions for the arbitration ID and network ID respectively and eight dimensions for data bytes). The training dataset 22 may, for example, consist of CAN bus traffic acquired from a vehicle known to be operating normally. For example, the training data can be acquired at the automobile manufacturer facility, using a vehicle straight off the assembly line, or a pre-production model, or some other vehicle without third-party ECUs.

In addition to training the temporal classifier and the state space classifier, the dataset of only normal messages 22 is also used to create or modify the observed header list 5, by constructing the observed header list 5 as a list of all IDs (or other headers) observed in the training data set 22. This is based on the expectation that if the dataset 22 of all normal data is sufficiently comprehensive then it may be expected that any arbitration ID that is not represented in the training dataset 22 is reasonably assumed to be an anomaly. For training the temporal anomaly classifier 11, the training dataset 22 is partitioned by a data partitioner 24 into training sub-sets that are input to a temporal anomaly classifier training system 44, and into testing or validation sub-sets that are used by the training system 44 for validating the trained temporal classifier.

Figure 3:
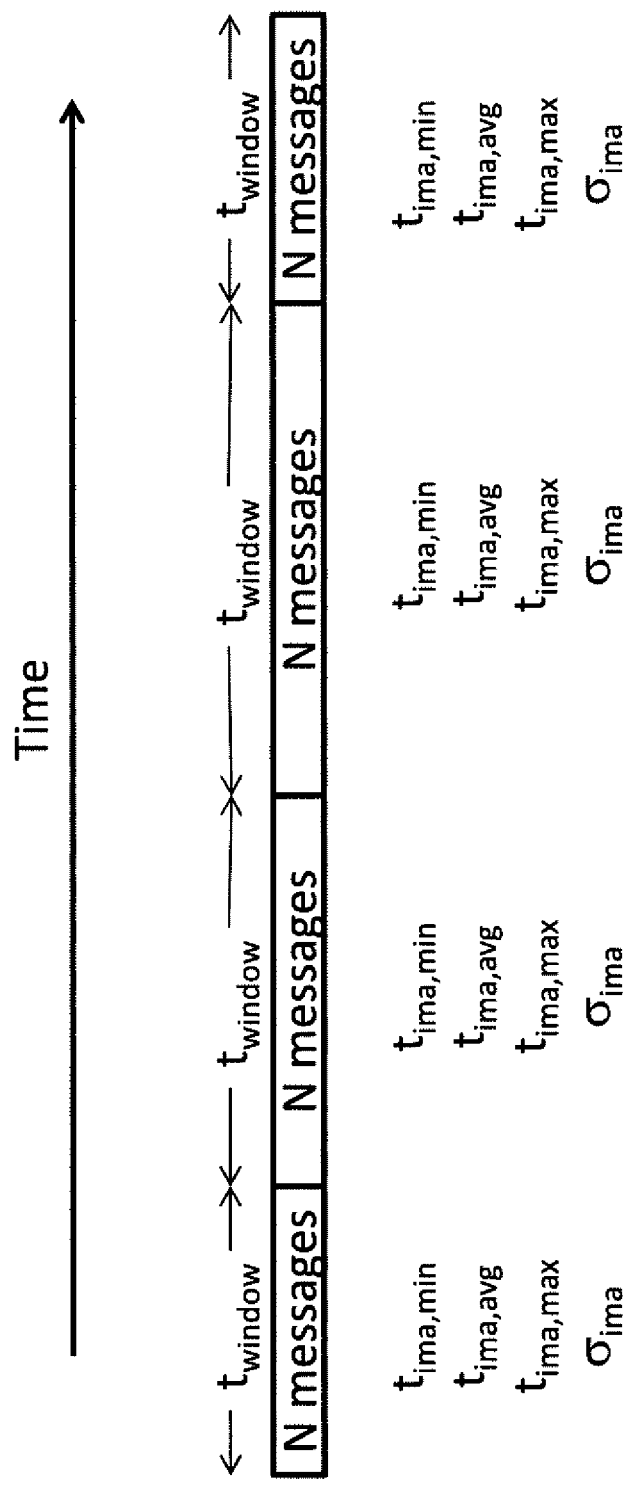
FIG. 3 diagrammatically illustrates processing performed by the temporal classifier of FIG. 1.

With brief reference to FIG. 3, in general the temporal classifier characterizes the rate at which messages arrive (either all messages, or messages of a particular arbitration ID or type of arbitration ID or particular bus/stream) using suitable statistical characteristics, such as the minimum inter-message arrival time ($t_{ima,min}$), maximum inter-message arrival time ($t_{ima,max}$), average inter-message arrival time ($t_{ima,avg}$), and standard deviation ($\sigma_{ima}$) or variance ($\sigma_{ima}^2$) of the inter-message arrival time, over a specified window. In the case of generating statistics for all messages, the inter-message arrival time is the time interval from arrival of one message to arrival of the next consecutive message in the CAN bus message stream. This is done per stream. In the case of generating statistics for messages of a particular type (e.g. a particular arbitration ID), the inter-message arrival time is the time interval from arrival of one message of that type to arrival of the next message of that type in the CAN bus message stream—there may be intervening messages of other types. In illustrative examples, the window is defined by a number of messages (N), and the time interval over which these N messages arrive is designated as the burst time ($t_{window}$). These are merely illustrative parameters, and other statistical parameters and window definitions may be used in temporally characterizing occurrences of messages of various type and/or of the entire stream of CAN bus messages. If sufficient training data are available, these statistical metrics may be computed by sliding the window of size N over the data set and then averaging to generate more representative values, or more generally performing suitable segmentation/averaging of the statistics over the data set.

With returning reference to FIG. 2, in an illustrative embodiment the temporal analysis is limited to those arbitration IDs of a "sufficiently repetitive" nature, which are deemed to be (quasi-)periodic. In a suitable approach, the temporal anomaly classifier training system 44 processes a training set (or sub-set) obtained from the first computes statistics for all messages (regardless of arbitration ID) in an operation 26. This provides information on the message density being carried by the CAN bus, and can be used for example to select a suitable value of the window size N. In an operation 28, statistics are computed for each observed arbitration ID (limited to those arbitration Ds that occur at least a threshold number of times in the message stream, and/or otherwise limited). As discussed with reference to FIG. 3, the operations 26, 28 may optionally be repeated for successive (or sliding) windows of size N and averaged or otherwise aggregated or combined to produce smoother and more accurate statistics. In an operation 30, the arbitration ID statistics are filtered to retain those arbitration IDs whose statistics indicate sufficient (quasi-)periodicity or repetitiveness. In an optional operation 32, a different (validation) training data sub-set is used to test the statistic to further filter out those arbitration IDs whose temporal analyses (based on the statistics generated in operation 28) produce too many false positives (for the illustrative case of all "normal" training data 22, any positive output by the temporal classifier is considered a false positive). In an operation 34, the statistics for the messages as a whole generated in operation 26 and the statistics for those arbitration IDs generated in operation 28 and not filtered out by operations 30, 32 are stored, thus defining the temporal pattern classifier statistical definitions 11' that is then used by the ECU 10 to implement the temporal pattern classifier 11.

The training data set 22 is also suitably partitioned by the data partitioner 24 to generate training and testing data sub-sets for use by a one-class SVM classifier trainer 36 to train the state space anomaly classifier 13, or to train another chosen type of one-class classifier, which is then used by the ECU 10 as described with reference to FIG. 1. In one suitable embodiment, a one-class SVM classifier is employed with a Radial Basis Function (RBF) kernel, and the training entails choosing (optionally optimizing) tuning parameters such as the hyperplane curvature γ, Support Vector number parameter ν, and hyperplane granularity or margin parameter ε. For a given set of tuning parameters, the SVM is suitably trained to optimally select Support Vectors from the training data (sub-) set, and this may be iterated for a grid search of tuning parameters, along with cross-validation processing to provide robustness. The output of the one-class SVM classifier trainer 36 is an SVM state space classifier definition 13' (e.g. including the Support Vectors and the tuning parameters) which is then used by the ECU 10 to implement the state space anomaly classifier 13.

In the following, a more detailed illustrative example of the temporal anomaly classifier training system 44 is described. The timing characteristics of all periodic messages are learned, as well as the timing characteristics of the buses being monitored (in the illustrative embodiment there is only one CAN bus 2 as seen in FIG. 1, but more generally the CAN security system may monitor one, two, three, or more different CAN buses—in the following, temporal anomaly detection for the single illustrative CAN bus 2 is described).

To learn the timing characteristics of periodic messages and build a temporal model, the following global parameters are computed over the entire data set 22 (for all messages, without regard to the arbitration ID; this corresponds to operation 26 of FIG. 2):

The average message density on the CAN bus over the entire dataset is computed.

At this average density, the number of messages (N) expected over a specified time window (e.g. 5 seconds), called queue_length, is calculated. In a suitable embodiment, N is set at 5000 by default, with a minimum value of 10, and a maximum value of 10000. After this calculation, N is set to the new value as long as it falls between the default minimum and maximum values.

For the bus queue, a sliding window of size N is used to determine the shortest inter-message arrival time $t_{ima, min}$ for all messages (that is, the shortest time interval between consecutive messages without regard to arbitration ID or other message type).

For the bus queue, the same sliding window of size N is used to determine the shortest burst time (that is, the shortest time between N consecutive messages, corresponding to the smallest value $t_{window}$ for any of the sliding windows of size N in FIG. 3 when all messages are counted regardless of arbitration ID).

Operation 28 is then performed in this illustrative example to compute statistics for individual arbitration IDs as follows. As each message is processed in turn, it is checked to see if the arbitration ID has been seen before. This is done in order to initialize a per-arbitration ID queue. The following calculations are initiated for each unique arbitration ID seen. For example, if an arbitration ID is seen for the first time, a new queue is initiated for it, where N messages of this arbitration ID are collected. When the window gets to the designated size N (e.g. 5000 messages in a preferred embodiment), the following occurs:

For each queue, the algorithm uses a sliding window of size N to determine the shortest, longest, and average inter-message arrival $t_{ima}$ for messages in the queue of each arbitration ID. In a suitable approach, a queue is set up to collect 5000 messages for each arbitration ID. As the queue fills up (first 5000 messages collected), statistics are generated for that window. Thereafter, when a new message arrives, the first (oldest) of the 5000 messages is removed and the newest arriving message (5001th message) is added in at the arrival side (that is, a first-in-first-out, or FIFO, buffer is employed), making the new sliding window still have 5000 messages. The statistics are then computed over the new set of messages. This process continues for each new incoming message for that arbitration ID. In a variant approach, the statistics may be updated after every n new messages rather than after every new message (e.g., update statistics after every 10 new messages come in). The resulting values are stored in a hash table for use during evaluation.

If the CAN bus is idle for a designated number of seconds (e.g. 60 seconds in a preferred embodiment) then no more statistics are generated for that queue. By "idle" it is meant that no messages are transmitted on that bus in the designated time interval.

Average density is calculated once the total number of messages received is greater than a predetermined minimum number (e.g. 5000 initially in the above example, but it is contemplated to adjust the sliding window size for a given ID based on the frequency of occurrence of that ID, e.g., the minimum window size may be 10 for some infrequently occurring IDs). If the total number of messages received is less than the minimum window size (e.g. 10 messages), then no statistics are computed for the arbitration ID. If the minimum number of messages for a given Unique ID is less than 5000, then no statistics are computed for the associated arbitration IDs. Similarly, if the total number of messages received over the entire bus is less than the default N value (e.g. 5000 messages) then the algorithm will determine that messages on the bus cannot be trained due to insufficient training time. Under these circumstances, the algorithm will terminate with an appropriate error message.

The operation 30 of identifying the arbitration IDs with sufficient repetitiveness (quasi-periodic) is next described for this illustrative embodiment. For each arbitration ID having computed statistics, the ratio of the maximum inter-message arrival time $t_{ima,max}$ to the minimum inter-message arrival time $t_{ima,min}$ is computed, and if this ratio is less than or equal to a threshold $T_p$ then the arbitration ID is considered periodic:

If $$\frac{t_{ima,max}}{t_{ima,min}} \leq T_p \text{ then ``periodic''} \quad (3)$$

In some embodiments $T_p=1.5$. More generally, $T_p \geq 1$ (by definition $t_{ima,max} \geq t_{ima,min}$ and so the ratio can never be less than unity), and smaller values of $T_p$ impose a "more strict" definition of periodicity while larger values of $T_p$ impose a "less strict" definition of periodicity. In some embodiments the threshold $T_p$ is in the range $1.0 \leq T_p \leq 2.0$, although values outside this range are contemplated. Those arbitration IDs that do not satisfy the periodicity criterion of Expression (3) are discarded (that is, are not analyzed with respect to temporal patterns).

The temporal characteristics can be impacted by collision avoidance. Due to collision avoidance, some random access queuing occurs at some of the transceivers when multiple ECUs try to transmit over a common channel. To compensate for this queuing, as well as for timing discrepancies when messages are received out-of-order, a queuing compensation factor is employed in this illustrative example, as calculated below. The collision avoidance back-off and retransmit can be modeled as a Markov model process, so that the inter-message arrival rate can be derived as:

$$\lambda = \begin{bmatrix} D_0 & D_1 & 0 & 0 \\ 0 & D_0 & D_1 & \ddots & 0 \\ 0 & 0 & D_0 & D_1 \end{bmatrix} \quad (4)$$

Where $D_0$ is a matrix of coefficients that represent delays due to collision detection and avoidance, and $D_1$ is a matrix of coefficients that represent inter-message arrival as a Poisson distribution. Parameter learning is achieved by deriving a maximum likelihood estimate of the parameter. Using Expectation Maximization, it is found that the compensator factor ($\lambda$) saddles around 0.83, which is rounded up to 0.85. Once training is complete, the entire hash table entry, along with the temporal parameters and formula values, is finalized as the trained model.

The operation 32 for this illustrative example is next described. Since temporal training is zero knowledge and periodicity is estimated during training, it is possible to mischaracterize some non-periodic arbitration IDs as periodic. This results in diminished accuracy on the part of the temporal anomaly detection component 11 (e.g. increased false positives). The operation 32 mitigates this by cross-validation of the temporal model against itself at the end of the training phase. An error higher than a selected threshold (e.g. 0.55 in one embodiment) indicates a mischaracterization of the message. The corresponding arbitration ID is discarded (that is, its statistics are not analyzed by the trained temporal pattern anomaly classifier 11).

In the operation 34, for those arbitration IDs that are deemed to have sufficient (quasi-)periodicity (as per operations 30, 32), the statistics $t_{ima,min}$, $t_{ima,max}$, $t_{ima,avg}$, $\sigma_{ima}$ computed in operation 28, along with statistics for undifferentiated (global) messages as computed in operation 26, are stored in a hash table against index values corresponding to the arbitration Ds. These statistics form the trained model for the temporal pattern anomaly classifier 11. During evaluation, each incoming message is collected, and its arrival time is put into two queues, viz., the bus queue and the queue of the arbitration ID. Once a queue (for the CAN bus or for an arbitration ID) reaches N messages, the delta between the inter-message arrival time of the first and last messages in the queues are calculated. These deltas are compared with the results stored in the hash table. If either the delta of the bus queue or the delta of the arbitration ID is smaller than the expected (stored) value by $2\sigma$ then these messages are flagged as anomalous. This is indicative of an event where messages are arriving faster than expected (such as due to a DoS attack or an ECU malfunction). Similarly, if the delta is larger than expected by $2\sigma$, (e.g. messages arriving too slowly, for example blocked or so forth) then temporal classification will mark those messages as anomalous as well. The threshold can be chosen differently, e.g. as $n\sigma$ (in some embodiments $2 \leq n \leq 6$ is expected to be an effective range). As another variant, the variance ($\sigma_{ima}^2$) can be used rather than the standard deviation ($\sigma_{ima}$). More generally, statistics of messages having analyzed arbitration IDs are compared with statistics for messages having the analyzed arbitration IDs in the training dataset 22 of CAN bus messages, and a temporal pattern of messages on the CAN bus is labeled as anomalous if the statistics comparison indicates a statistically significant deviation from the training dataset 22 of CAN bus messages.

After each evaluation, the queues are flushed and refilled, replacing the oldest message with the newest. This evaluation process continues until evaluation mode stays on and new messages are coming in from the bus. If there are less than 5000 messages for any arbitration ID, then the algorithm will not evaluate those messages. Likewise for the queue.

The illustrative temporal pattern anomaly classifier 11 is trained based on "zero knowledge", based on the training set 22 of all normal messages. If some additional information is available, then this can be incorporated into the temporal pattern anomaly classifier. For example, if it is known that arbitration IDs associated with vehicle braking only occur under certain conditions that are associated with certain other arbitration IDs (e.g. brake pedal pressed, or electronic stability system active), then the occurrence of messages with arbitration IDs associated with vehicle braking in the absence of messages with those certain other arbitration IDs may be designated as an anomalous temporal pattern.

The illustrative CAN bus security monitoring is described in the context of a vehicle. More generally, the disclosed CAN bus security monitoring can be employed in conjunction with CAN buses for other systems and apparatuses, such as vehicles generally (automobiles, trucks, railroad locomotives, watercraft, aircraft, et cetera), nuclear reactor control systems, orbiting satellites, ocean buoys, medical systems, and so forth.

It will further be appreciated that the disclosed anomaly detection techniques may be embodied as a non-transitory storage medium storing instructions readable and executable by the computer 20, (microprocessor or microcontroller of an) embedded system such as the illustrative ECU 10, or various combinations thereof. The non-transitory storage medium may, for example, comprise a hard disk drive, RAID or the like of a computer; an electronic, magnetic, optical, or other memory of an embedded system, or so forth.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An anomaly detector for a Controller Area Network (CAN) bus, the anomaly detector comprising an electronic data processing device programmed to perform an anomaly alerting method including the operations of:
    performing state space classification via a Support Vector Machine (SVM)-based classifier on a per-message basis of messages on the CAN bus to label each message as either normal or anomalous;
    performing temporal pattern analysis of messages on the CAN bus as a function of time to label unexpected temporal patterns as anomalous wherein the temporal pattern analysis includes the operations of comparing statistics of messages having analyzed arbitration IDs with statistics for messages having the analyzed arbitration IDs in a training dataset of CAN bus messages, and labeling a temporal pattern of messages on the CAN bus as anomalous if the statistics comparison indicates a statistically significant deviation from the training dataset of CAN bus messages wherein the analyzed arbitration IDs include arbitration IDs that appear in the training dataset of CAN bus messages and satisfy a periodicity criterion in the training dataset of CAN bus messages wherein an arbitration ID satisfies the periodicity criterion if $$\frac{t_{ima,max}}{t_{ima,min}} \leq T_p$$

where $T_p$ is a threshold and $t_{ima,max}$ and $t_{ima,min}$ are a maximum inter-message arrival time and a minimum inter-message arrival time, respectively, over a time window; and
    issuing an alert if an alert criterion is met that is based on the outputs of the state space classification and the temporal pattern analysis.

2. A vehicle including:
    a vehicle Controller Area Network (CAN) bus; and
    a vehicle Electronic Control Unit (ECU) communicating via the vehicle CAN bus, the vehicle ECU programmed to implement an anomaly detector as set forth in claim 1.

3. The anomaly detector of claim 1 wherein the anomaly alerting method includes the further operation of:
    comparing header information for each message on the CAN bus with a list of observed headers;
    wherein the alert criterion is further based on the output of the header information comparison.

4. The anomaly detector of claim 1 wherein the statistics include statistics pertaining to inter-message arrival times.

5. The anomaly detector of claim 1 wherein the comparing includes adjusting the statistics for collision avoidance backoff-retransmit operations performed by the CAN bus.

6. The anomaly detector of claim 1 wherein the analyzed arbitration IDs include arbitration IDs that appear in the training dataset of CAN bus messages and satisfy a periodicity criterion in the training dataset of CAN bus messages, and further are classified by the temporal pattern analysis with accuracy satisfying a threshold for data partitioned from the training dataset of CAN bus messages.

7. The anomaly detector of claim 1 wherein $1.0 \leq T_p \leq 2.0$.

8. The anomaly detector of claim 1 implemented in one of a vehicle, nuclear reactor control system, orbiting satellite, ocean buoy, or medical system.

9. An anomaly detector for a Controller Area Network (CAN) bus, the anomaly detector comprising an electronic data processing device programmed to perform an anomaly alerting method including the operations of:
    performing temporal pattern analysis of messages on the CAN bus as a function of time to label unexpected temporal patterns as anomalous wherein the temporal pattern analysis includes comparing statistics of messages having analyzed arbitration IDs with statistics for messages having the analyzed arbitration IDs in a training dataset of CAN bus messages wherein the analyzed arbitration IDs include arbitration IDs that appear in the training dataset of CAN bus messages and satisfy a periodicity criterion in the training dataset of CAN bus messages wherein an arbitration ID satisfies the periodicity criterion if $$\frac{t_{ima,max}}{t_{ima,min}} \leq T_p$$

where $T_p$ is a threshold and $t_{ima,max}$ and $t_{ima,min}$ are a maximum inter-message arrival time and a minimum inter-message arrival time, respectively, over a time window; and
    issuing an alert if the statistics comparison for the temporal pattern indicates a statistically significant deviation from the training dataset of CAN bus messages.

10. A vehicle including:
    a vehicle Controller Area Network (CAN) bus; and
    a vehicle Electronic Control Unit (ECU) communicating via the vehicle CAN bus, the vehicle ECU programmed to implement an anomaly detector as set forth in claim 9.

11. The anomaly detector of claim 10 wherein the statistics include statistics pertaining to inter-message arrival times.

12. The anomaly detector of claim 10 wherein the comparing includes adjusting the statistics for collision avoidance backoff-retransmit operations performed by the CAN bus.

13. The anomaly detector of claim 10 wherein the analyzed arbitration IDs include arbitration IDs that appear in the training dataset of CAN bus messages and satisfy a periodicity criterion in the training dataset of CAN bus messages and further are classified by the temporal pattern analysis with accuracy satisfying a threshold for data partitioned from the training dataset of CAN bus messages.

14. An anomaly alerting method monitoring communication on a Controller Area Network (CAN) bus, the anomaly alerting method including the operations of:

performing temporal pattern analysis of statistics of inter-message arrival times of messages on the CAN bus as a function of time to label unexpected temporal patterns as anomalous wherein the temporal pattern analysis includes the operations of comparing statistics of messages having analyzed arbitration IDs with statistics for messages having the analyzed arbitration IDs in a training dataset of CAN bus messages, and labeling a temporal pattern of messages on the CAN bus as anomalous if the statistics comparison indicates a statistically significant deviation from the training dataset of CAN bus messages wherein the analyzed arbitration IDs include arbitration IDs that appear in the training dataset of CAN bus messages and satisfy a periodicity criterion in the training dataset of CAN bus messages wherein an arbitration ID satisfies the periodicity criterion if $$\frac{t_{ima,max}}{t_{ima,min}} \leq T_p$$

where $T_p$ is a threshold and $t_{ima,max}$ and $t_{ima,min}$ are a maximum inter-message arrival time and a minimum inter-message arrival time, respectively, over a time window; and issuing an alert if an alert criterion is met that is based at least on the output of the temporal pattern analysis;

wherein the anomaly alerting method is performed by an electronic data processing device.

15. The anomaly alerting method of claim 14 including the further operation of:

performing state space classification on a per-message basis of messages on the CAN bus to label each message as either normal or anomalous;

wherein the alert criterion is based on the outputs of the state space classification and the temporal pattern analysis.

* * * * *